United States Patent [19]

Patterson et al.

[11] 4,429,818
[45] Feb. 7, 1984

[54] CARRIER RACKS FOR BICYCLES

[75] Inventors: Thomas C. Patterson, Westport; David L. Campbell, Norwalk, both of Conn.

[73] Assignee: Cannondale Corporation, Georgetown, Conn.

[21] Appl. No.: 307,804

[22] Filed: Oct. 2, 1981

[51] Int. Cl.³ .............................................. B62J 7/04
[52] U.S. Cl. ................................. 224/39; 224/30 R; 280/289 A
[58] Field of Search ............... 224/30 R, 32 R, 32 A, 224/34, 39, 31, 33 R, 37; 280/202, 289 R, 289 A

[56] References Cited

U.S. PATENT DOCUMENTS

| 1,375,752 | 4/1921 | Green | 224/39 R |
| 2,588,671 | 3/1952 | Tringali | 224/30 R |
| 2,759,239 | 8/1956 | Snyder | 403/407 X |
| 3,827,613 | 8/1974 | Meyer | 224/32 A X |
| 3,873,127 | 3/1975 | McNichol, Jr. et al. | 280/202 |
| 4,113,158 | 9/1978 | Niemann | 224/32 A X |
| 4,141,587 | 2/1979 | Holcomb | 224/30 R X |
| 4,154,382 | 5/1979 | Blackburn | 224/39 R |

FOREIGN PATENT DOCUMENTS

| 110934 | 10/1928 | Austria | 224/39 R |
| 64616 | 6/1946 | Denmark | 224/32 A |
| 821605 | 11/1951 | Fed. Rep. of Germany | 280/289 A |
| 563581 | 9/1923 | France | 224/30 R |
| 437783 | of 1948 | Italy | 224/30 R |
| 488763 | of 1954 | Italy | 224/39 R |
| 414702 | 8/1934 | United Kingdom | 224/32 R |
| 414815 | 8/1934 | United Kingdom | 224/32 R |
| 425531 | 3/1935 | United Kingdom | 224/32 R |

Primary Examiner—William T. Dixson, Jr.
Assistant Examiner—Gary E. Elkins
Attorney, Agent, or Firm—Brumbaugh, Graves, Donohue & Raymond

[57] ABSTRACT

A carrier rack for bicycles comprises a load-supporting platform composed of a peripheral frame and at least one cross piece that has internal threads at each end. The upper end of each of a pair of struts is clamped between the cross piece and the respective side of the frame by a screw that passes through holes in the side portion and the upper end of the strut and is threaded into the end portion of the cross piece. A rear carrier rack includes a pair of front end connecting bars attached to the platform for adjustment fore and aft. Each connecting bar is a flat metal band, the major portion of which is oriented flatwise to the platform. The front end portion of each connecting bar is twisted approximately 90° so that it lies flatwise to the seat stays. Each connecting bar is connected to a seat stay by an offset ring clamp.

10 Claims, 9 Drawing Figures

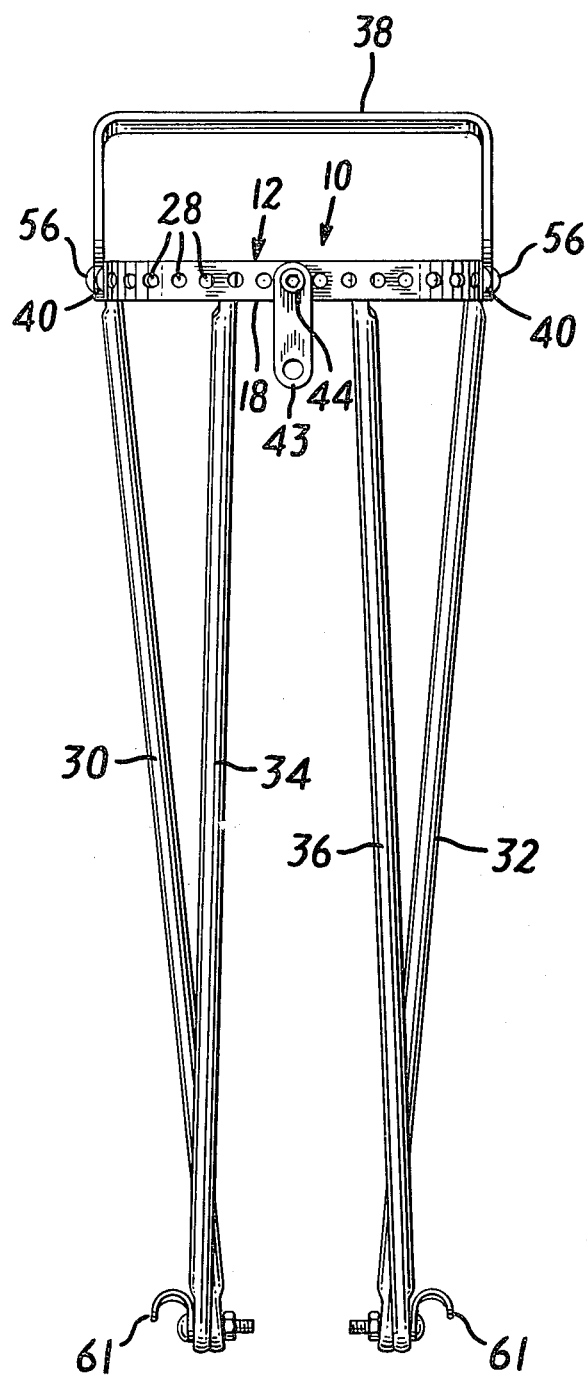
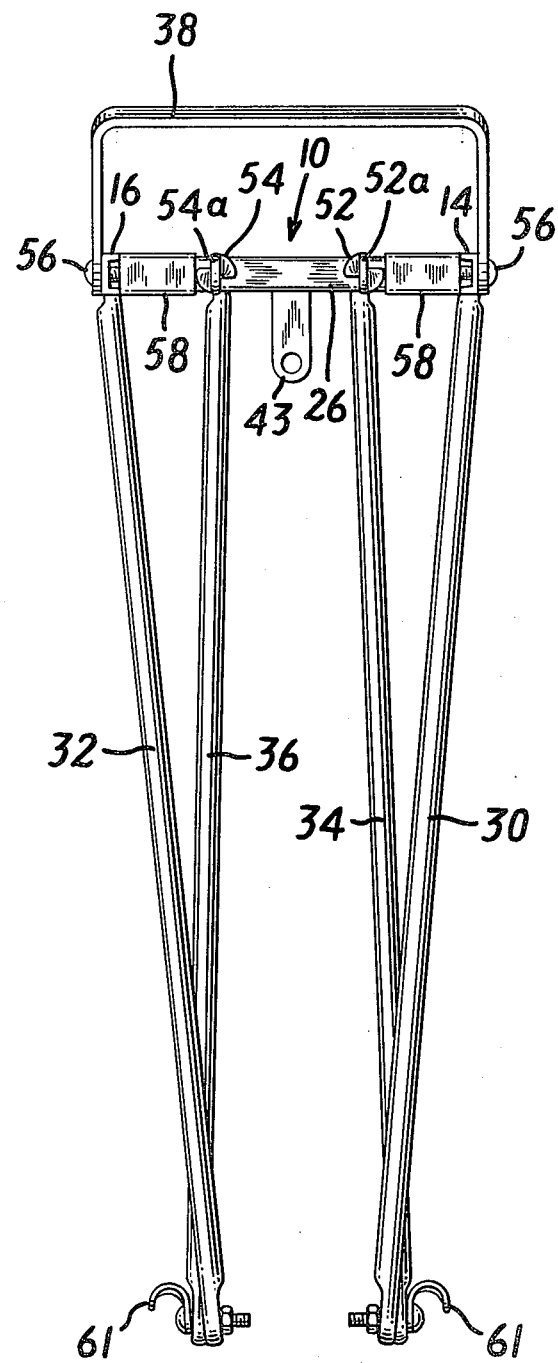
FIG. 3
FIG. 4

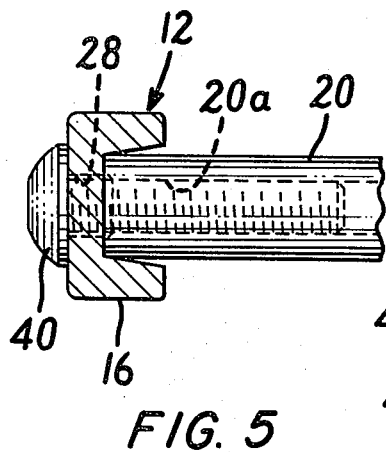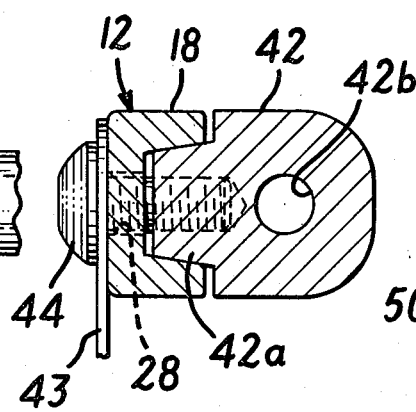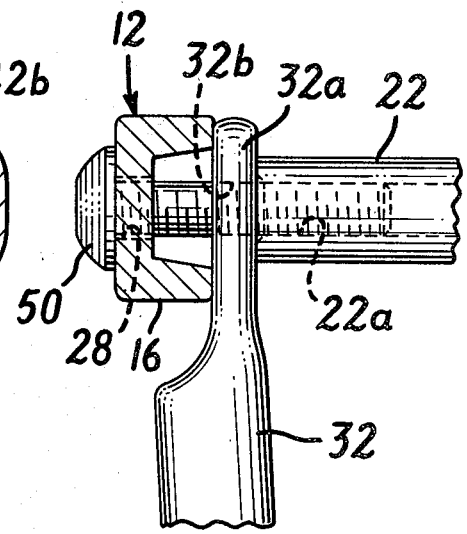
FIG. 5　　FIG. 6　　FIG. 7
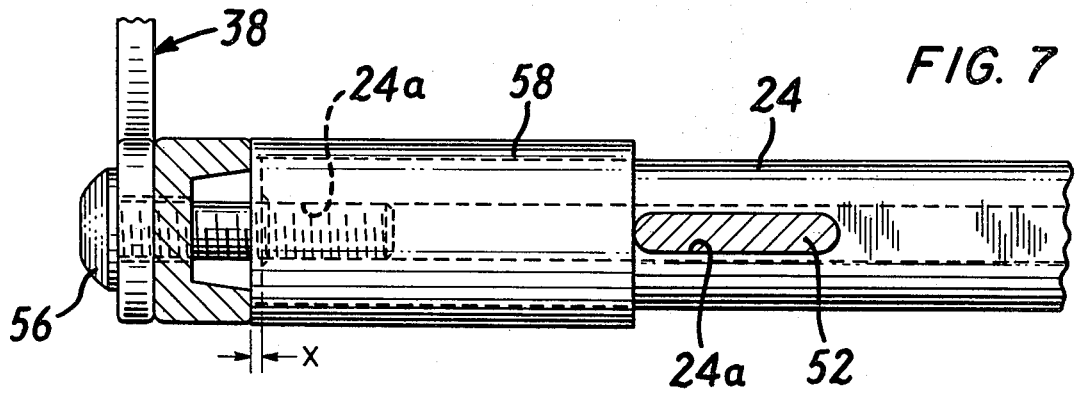
FIG. 8
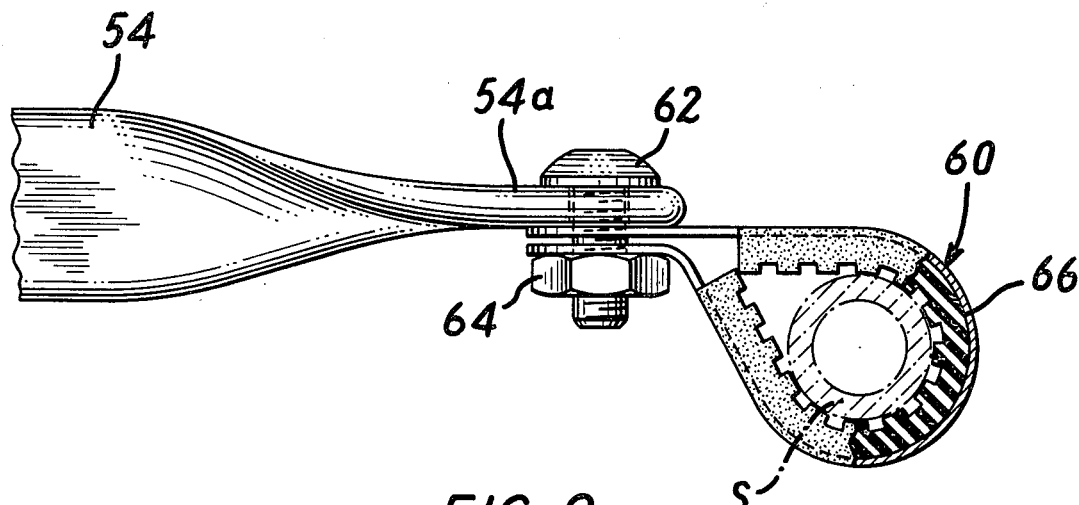
FIG. 9

CARRIER RACKS FOR BICYCLES

BACKGROUND OF THE INVENTION

Most bicycle owners equip their bicycles with a carrier rack, more often with a rear carrier rack, but in some cases a front carrier rack. Experienced bicycle riders know that a carrier rack must be as rigid and as rigidly attached to the bicycle as possible, lest a load carried on the rack sway from side to side and make it more difficult to control the bicycle. A swaying load will require the rider to be much more attentive to steering and balance than he or she otherwise would be, and the rider will tire much more quickly when riding a bicycle with a heavy load that sways from side to side. Many bicycle carrier racks on the market today are not sufficiently strong and not adequately secured to the bicycle to prevent substantial swaying, even with comparatively light loads. When the rack carries loaded panniers, sleeping bags and other articles required for bicycle touring, it is virtually essential that the bicyclist have a very rigid, high quality carrier rack.

U.S. Pat. No. 4,154,382, issued May 15, 1979, and entitled "Bicycle Rack" describes and illustrates a rear carrier rack made of bent metal rods that define the platform frame and three inverted U-shaped struts and that are joined together by welding. The carriers described in that patent are strong and rigid and, as manufactured and marketed in substantially the forms described and illustrated in the patent, are generally acknowledged to be of high quality. On the other hand, they have some disadvantages. For one thing, the unitized construction virtually eliminates the possibility of repairing a carrier, should there be some failure, particularly a weld failure or a broken or severely bent frame or strut. Any bent or broken part cannot be replaced and if that part cannot be repaired, the carrier will have to be discarded. Also, they must be packaged, shipped, stocked and sold in large cumbersome boxes.

The patent describes and illustrates two forms of the carrier, one of which provides for three point attachment to the bicycle and the other of which provides for four point attachment. In the three point version, a bent metal connecting strip can be adjusted longitudinally along a supporting guide that extends lengthwise along the center line of the carrier and is welded to a pair of longitudinally spaced-apart cross pieces of the frame. The connector strip has a lengthwise slot through which screws that pass through the guide bar extend, and nuts threaded on the screws under the connector piece clamp the connector piece in a desired position. The front end of the connector strip turns downwardly and is shaped and positioned to be connected to the bolt that fastens the rear brake caliper to the bicycle frame. This adjustable single point front attachment provides very little resistance to swaying of the rack by pivoting about the single front attachment point.

In the other version of carrier described and shown in the above-mentioned patent, two connecting bars constituted by forwardly extending legs of a U-shaped member welded to the cross pieces enable the carrier rack to be connected to the seat stays using ring clamps or special fittings brazed to the seat stays. This version allows, therefore, four point attachment of the carrier to the bicycle, and the two connecting points at the front do not allow the pivoting type of swaying to nearly the extent of the single front-connecting point version. On the other hand, a given four point carrier rack will not properly fit many popular commercially available bicycles, inasmuch as the four connecting points are geometrically and dimensionally fixed, whereas the positions of the seat stays and the accessory holes near the rear axle where the lower ends of the struts are attached differ among different sizes and makes of bicycles.

SUMMARY OF THE INVENTION

A carrier rack, in accordance with the present invention, eliminates the aforementioned disadvantages of the carrier racks described in U.S. Pat. No. 4,154,382 in that it is made up of several components that are connected together in a manner which enables them to be disassembled and replaced individually and provides four point attachment to a bicycle in a way that enables it to be installed on virtually all makes and sizes of bicycle frames. It provides excellent resistance to vertical, lateral and longitudinal forces by virtue of the triangulation of the struts and four point connection to the bicycle. It could be packaged in "knocked-down" condition, a potential advantage to stocking distributors and retailers.

More particularly, a carrier rack, according to the present invention, comprises a load-supporting platform that includes a peripheral frame having spaced-apart side portions. At least one cross piece extends between the side portions and has an internally threaded hole at each end. The upper end of each of a pair of side struts is received between each side portion of the frame and the corresponding end of the cross piece. A screw extends through a hole in the side portion and a hole in the strut and is threaded into the cross piece, thereby detachably to clamp the strut between the side portion of the frame and the cross piece. Uniquely, the cross piece provides the dual functions of defining part of the load-supporting platform of the carrier and serves as a nut for each of the screws by which the two struts are joined to the platform and by which the cross piece itself is joined to the peripheral frame.

In a preferred embodiment of the invention, there is a second pair of struts, namely, rear struts in the case of a rear carrier and front struts in the case of a front carrier. A transverse bracket is affixed to the end portion of the frame and has an internally threaded hole opening laterally outwardly at each end. A screw passes through a hole in the upper end of each second strut and is threaded into the bracket to fasten the strut to the respective end of the bracket.

A rear carrier embodying the present invention preferably includes the pair of laterally spaced-apart seat stay connecting bars that are attached to the carrier frame for adjustment longitudinally of the frane. Each such connecting bar is a band of metal having a rear portion oriented with its major surfaces in substantially horizontal planes, thereby to provide substantial strength and rigidity in the lateral direction. The front portion of each connecting bar is twisted approximately 90° generally about the longitudinal axis of the band, thereby to provide a generally vertical orientation of the front end portion so that it lies flatwise to the seat struts. A ring clamp is used to connect the front end portion of each connecting bar to the respective seat stay. By using an offset ring clamp, a considerable range of spacing between the seat stays can be accommodated by selecting the manner of installation of the ring clamps and the manner of connecting the ring clamps to the connecting bars. The ring clamps can be reversed in orientation with respect to the seat stays so that the connecting legs lie either outboard or inboard of the seat stays, and the ring clamp legs may lie outboard or inboard of the connecting bars. The ring clamps, of course, can be adjusted up and down and, in conjunction with the fore and aft adjustment of each of the connecting bars, enable the platform to be leveled and strongly secured at four points to the bicycle for maximum rigidity and resistance to fore and aft and lateral movement.

The invention has the advantage of being capable of disassembly quickly and easily for replacement of damaged parts. Of particular benefit is the fact that the original manufactured struts can be replaced by any sort of metal rods, bars or channels of the type that can be bought at almost any reasonably well-stocked hardware store, so one can fairly easily fashion a temporary replacement strut or struts from generally available materials. Similarly, the screws can be replaced by standard, generally available screws. The ability of the carrier rack to fit virtually all bicycle frame sizes makes it unnecessary for distributors and dealers to stock various sizes of carriers or various accessories to adapt given carriers to the various models of bicycle. From the manufacturers point of view costs are reduced by enabling a single set of tooling to be used to manufacture the complete requirements rather than to have several sets of special tooling for making several models and sizes.

The carrier rack of the invention does not require any welding, which is a comparatively expensive manufacturing technique, and provides further cost advantages in that respect.

For a better understanding of the invention, reference may be made to the following description of an exemplary embodiment, taken in conjunction with the figures of the accompanying drawings.

DESCRIPTION OF THE DRAWINGS

FIG. 3 is a rear elevational view of the embodiment;
FIG. 4 is a front elevational view of the embodiment;
FIG. 5 is a fragmentary cross-sectional view taken generally along the lines 5—5 of FIG. 1 and in the direction of the arrows;
FIG. 6 is a fragmentary cross-sectional view taken generally along the lines 6—6 of FIG. 1 and in the direction of the arrows;
FIG. 7 is a fragmentary cross-sectional view taken generally along the lines 7—7 of FIG. 1 and in the direction of the arrows;
FIG. 8 is a fragmentary cross-sectional view taken generally along the lines 8—8 of FIG. 1 and in the direction of the arrows;
FIG. 9 is a fragmentary cross-sectional view taken through a seat stay just above the place where the ring clamp is installed; portions are broken away for a clearer illustration.

DESCRIPTION OF THE EXEMPLARY EMBODIMENT

Figure 1:
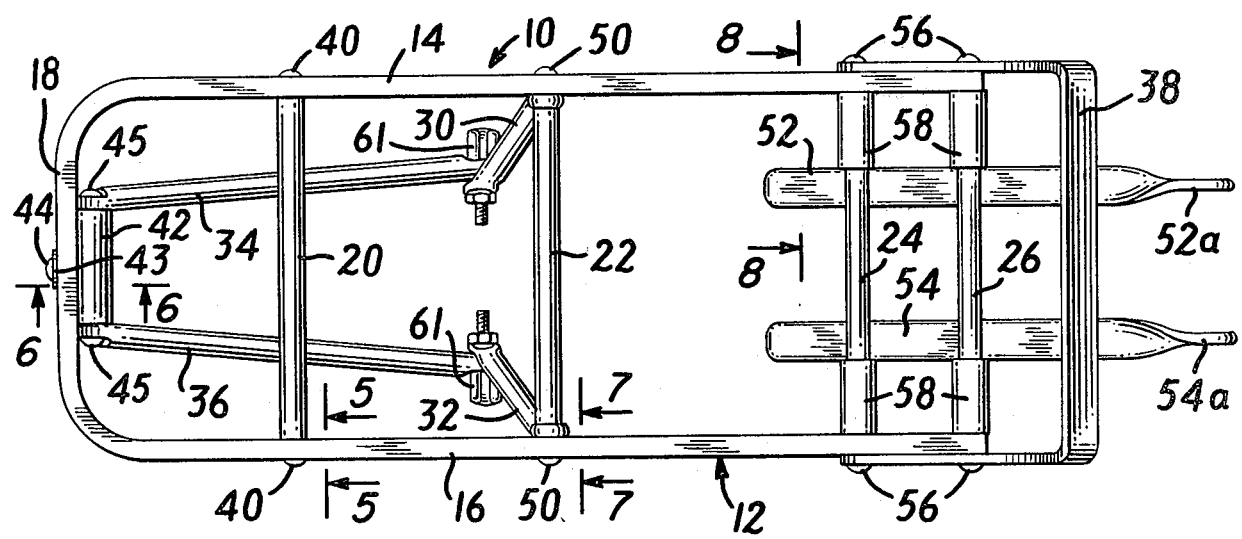
FIG. 1 is a top plan view of the embodiment.
Figure 2:
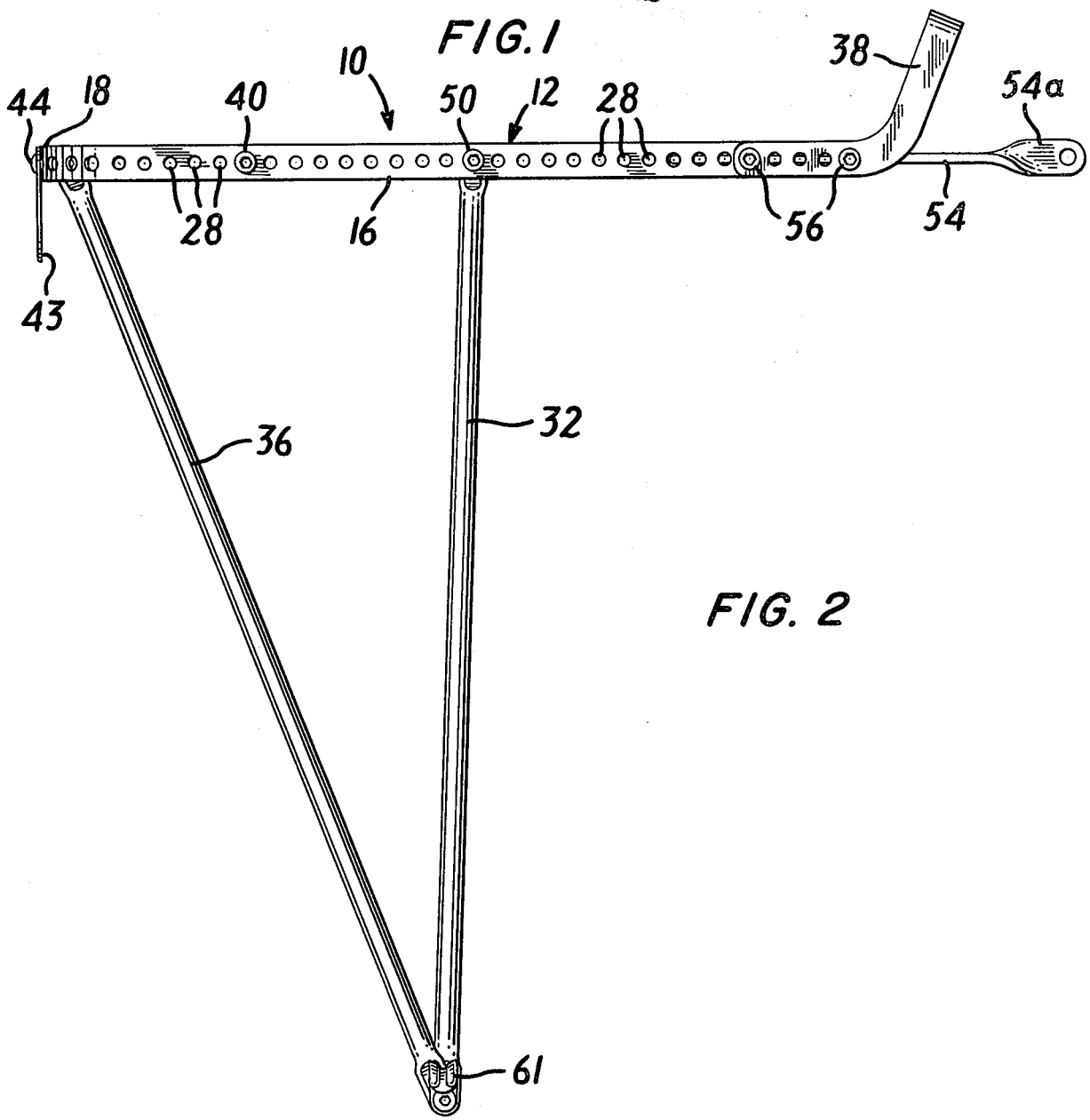
FIG. 2 is a side elevational view of the embodiment.

The embodiment shown in the drawings is a rear carrier rack, but as described briefly below, some of the features of the rear carrier rack shown in the drawings can be applied in the design and manufacture of a front carrier rack.

The carrier rack comprises a platform 10 assembled from a generally U-shaped peripheral frame member 12, which consists of a pair of laterally spaced-apart side portions 14 and 16 and a rear end portion 18, and four cross pieces 20, 22, 24 and 26. The peripheral frame member is preferably an aluminum extrusion that is channel-shaped in cross section (see FIGS. 5 to 7). It has uniformly and closely spaced-apart holes 28 in the base of the channel along its entire length. The platform is supported over the rear wheel of the bicycle by a pair of main struts 30 and 32 and a pair of rear struts 34 and 36. The main struts 30 and 32 extend substantially vertically down from approximately the middle of the platform 10. Two rear struts 34 and 36 extend downwardly, outwardly and forwardly from attachment points located fairly close to and symmetrically with respect to the longitudinal center line of the platform to attachment points at the bicycle accessory holes, thereby providing triangulation for lateral rigidity. A combination handle and brake protector 38 is connected to the front ends of the respective side portions 14 and 16 of the peripheral frame member 12.

Referring to FIG. 5, the cross piece 20 is a length of tubing having a central hole that is tapped to provide an internally threaded portion 20a at each end. Screws 40 are inserted through selected holes 28 in the respective side portions 14 and 16 and threaded into the threaded portions 20a of the cross piece 20. The position of the cross piece 20 can be selected by the user such that the cross piece can provide a tying point or a location for engagement with a pannier hook or in some other way suit the particular needs of the user.

A bracket 42 made by cutting a short piece from an extrusion of the cross section shown in FIG. 6 is fastened by a screw 44 to the rear portion 18 of the peripheral frame. This screw also serves to attach a reflector bracket 43 to the back of the carrier. The cross section of the extrusion is such as to provide a tapered leg portion 42a that matches a correspondingly tapered channel within the frame member 12, thereby providing for rigid, shake-proof attachment of the bracket 42 to the frame. A hole 42b extends longitudinally through the body of the bracket 42 and is tapped at each end to receive screws 45 (see FIG. 1) by which the respective rear struts 34 and 36 are attached to the bracket. The upper end of each strut 34, 36 has a flattened portion having a hole through which the screw 45 passes.

The flattened upper end portion 32a (FIG. 7) of each main strut 30 or 32 is received between the respective side portion 14 or 16 of the peripheral frame 12 and the corresponding end of the cross piece 22. The cross piece 22 is a tubing having an internally threaded portion 22a at each end. A screw 50 is inserted through a selected hole 28 in the side portion (e.g., 16) of the frame 12, passes through a hole 32b in the flattened portion 32a of the strut and is threaded into the tapped portion 22a of the cross piece. It is apparent that the cross piece 22 constitutes a structural part of the platform 10, and it also provides a nut by which it is itself secured to the frame and by which the upper end of each strut 32 and 34 is connected to the frame 12. Each strut is strongly and rigidly clamped between the respective end of the cross piece 22 and the frame portion 14 or 16.

Referring to FIG. 8, each of the cross pieces 24 and 26, in addition to providing a structural part of the platform 10, supports a pair of laterally spaced-apart, longitudinally extending seat stay connecting bars 52 and 54. Each connecting bar 52, 54 is a metal band having a width substantially greater than its thickness and is received flatwise through a slot (e.g., 24a) in each of the cross pieces 24 and 26. Each of the slots is shaped generally to match the cross sectional shape of the bar 52, 54 but is sufficiently large to allow the bar 52, 54 to be slid longitudinally fore and aft with respect to the platform 10. Each cross piece 24, 26 is a tubular member that fits in between the side portions 14 and 16 of the frame member 12 with a small end clearance, as indicated by the dimension line labelled "X" in FIG. 8. Internal threads (e.g., 24a) are tapped in each end of each cross piece 24, 26. A screw 56 passes through a hole in the handle 38, through one of the holes 28 in the frame 12 and is threaded into the tapped hole 24a at each end of each cross piece 24, 26. A spacer 56 fits over the end portion of each cross piece 24 and 26 outboard of each of the connecting bars 52 and 54. When the screw 56 is tightened, the clearance X allows the side portions 14 and 16 to be drawn toward each other and force each spacer 58 inwardly against the edge of the respective connecting bar 52 or 54, thereby clamping each connecting bar in a selected position.

The front end portion 52a and 54a, respectively, of each of the connecting bars 52 and 54 is twisted approximately 90° generally about the longitudinal axis of the band, thereby orientating that portion flatwise with respect to the seat stay S (see FIG. 9). In this way, the seat stay connecting bars are adapted to be secured readily to the seat stays by an offset ring clamp 60 or directly to bosses on the seat stays which some bicycles have.

To install the carrier rack on the bicycle, the flattened lower ends of the four struts, the flattened ends of the struts 30 and 32 being oriented opposite the flattened ends of the struts 34 and 36, are connected together with pannier hooks 61, to the accessory holes located near the rear axle of the bicycle frame, but the nuts are hand-tightened at this stage to enable the platform to be leveled with respect to the bicycle frame. Offset ring clamps 60 are assembled onto each seat stay of the bicycle. By a combination of forward or backward movement of each connecting bar 52 and 54 and vertical adjustment of the position of each ring clamp 60, the platform can be brought into the adjusted level position on the bicycle. When that position is attained, the screws 56 are tightened, thereby clamping the two connecting bars 52 and 54 securely to the frame member 12, and the screws 62 and nuts 64 on the ring clamps 60 and the screws and nuts at the lower end of the struts are tightened.

Various makes of bicycles come with seat stays of different diameters. The invention makes provision for this variation by providing hard rubber or plastic bushing strips 66 with the carrier rack and providing an over size ring clamp 60. Two strips of three different sizes are adequate to accommodate the different diameters of seat stays S generally in use. The thicker bushing strips 66 have transverse grooves so they will wrap easily around the seat stay S. Ribs along each edge of the outside surface define a groove entirely along the outer surface which receives the ring clamp 60 and insures that the bushing strip will not move out of position with respect to the ring clamp, especially in the process of installing the carrier. The bushing strips prevent marring the finish of the bicycle.

Although the embodiment is a rear carrier, a front carrier based on similar members and connections, but with a different rear fastening structure for connecting the platform to the front brake caliper bolt, will be readily apparent to one skilled in the art without departing from the spirit and scope of the present invention. Ordinarily the front carrier will have a closed frame and no handle and only one cross piece.

We claim:

1. A rear carrier rack for bicycles comprising a platform defined by a peripheral frame having at least two laterally spaced-apart side portions and a rear portion, a main strut extending generally downwardly from each side portion of the frame and adapted to be attached to a bicycle at an attachment location in the area of the rear axle to support the platform over the rear wheel, a pair of rear struts connected to the rear portion of the frame at locations substantial distances inwardly from the side portions and extending downwardly, forwardly and outwardly for attachment to the frame at said attachment locations, a pair of laterally spaced-apart seat stay connecting bars adjustably attached to the frame for adjustment longitudinally of the frame, each connecting bar being a band of metal having a rear portion oriented with its major surfaces flatwise to the platform, said rear portion extending substantially the entire distance from the platform to a distal front end portion for maximum lateral rigidity, said distal front end portion being twisted about 90° generally about the longitudinal axis of the band providing an orientation of said distal front end portion that is generally flatwise to the seat stays for connection to a seat stay.

2. A rear carrier rack according to claim 1 wherein the frame includes a pair of longitudinally spaced-apart transverse members located forwardly of the main struts, and further comprising means for releasably fastening the connecting bars to said transverse members.

3. A rear carrier rack according to claim 2 wherein the releasable fastening means includes longitudinal slots in the transverse members receiving the respective connecting bars, spacers received between each connecting bar and the side portion of the frame, and screws passing through at least one side portion and threaded into at least one end of the transverse members to tighten the side portions against the spacers and thereby clamp the connecting bar between the spacers and the slots.

4. A rear carrier rack according to claim 1 and wherein each side portion of the peripheral frame includes a multiplicity of transversely oriented longitudinally spaced-apart holes, and further comprising a cross piece extending between the upper ends of the main struts, both end portions of the cross piece being longitudinally internally threaded, the upper ends of the respective main struts being clamped between the side portions of the peripheral frame and the ends of the cross piece, and the fasteners being screws that pass through selected holes in the struts and are threaded into the respective end portions of the cross piece.

5. A rear carrier rack according to claim 1 wherein each side portion of the peripheral frame includes a multiplicity of transversely oriented longitudinally spaced-apart holes, and further comprising a transverse cross bar having internal threads in each end portion and screws received through selected ones of the holes in each side portion and threaded into the cross bar, the longitudinal position of the cross bar being variable among the holes in the peripheral member.

6. A rear carrier rack according to claim 1 and further comprising a transversely extending attachment bracket fastened to the rear portion of the peripheral frame and having an internally threaded hole opening outwardly at each end, and wherein each rear strut is fastened to the bracket by a screw that passes through a hole in the strut and is threaded into a corresponding hole in the bracket.

7. A rear carrier rack according to claim 1 and further comprising a ring clamp attached to the distal front end portion of each connecting bar and adapted to be connected to a seat stay, each ring clamp being larger than the seat stay of the bicycle, and further comprising a bushing strip adapted to wrap around the seat stay within the ring clamp.

8. A rear carrier rack according to claim 7 wherein each ring clamp is an offset ring clamp that is adapted to be attached to the seat strut in either of two opposite orientations and to be connected to either the inside or the outside face of the front end portion of the connecting bar.

9. A rear carrier rack for bicycles comprising frame means defining a load-supporting platform, at least two struts, one on each side of the platform, connected at their upper ends to the platform and extending generally downwardly for attachment adjacent their lower ends to the bicycle to support the platform over the bicycle wheel, a pair of transversely-spaced apart parallel longitudinally extending connecting bars, adjustable means releasably clamping each connecting bar to the platform for longitudinal adjustment, each connecting bar being a band of metal having a width substantially greater than its thickness, having the major portion oriented generally flatwise to the platform for resistance to lateral flexure, and having a distal front end portion being twisted about 90° generally about the longitudinal axis of the band, orienting the distal front end portion generally flatwise to the seat stays, and a ring clamp adapted to connect the distal front end portion of each connecting bar to a respective seat strut.

10. A rear carrier rack according to claim 9 wherein each ring clamp is an offset ring clamp that is adapted to be attached to the seat strut in either of two opposite orientations and to be connected to either the inside or the outside face of the front end portion of the connecting bar.

* * * * *